United States Patent [19]
Vogt et al.

[11] Patent Number: 5,178,362
[45] Date of Patent: Jan. 12, 1993

[54] ELECTROMAGNETICALLY ACTUATABLE VALVE

[75] Inventors: Dieter Vogt, Korntal-Münchingen, Fed. Rep. of Germany; Rudolf Babitzka, Anzola, Italy

[73] Assignee: Robert Bosch GmbH, Stuttgart, Fed. Rep. of Germany

[21] Appl. No.: 776,221
[22] PCT Filed: Feb. 23, 1991
[86] PCT No.: PCT/DE91/00152
    § 371 Date: Nov. 13, 1991
    § 102(e) Date: Nov. 13, 1991
[87] PCT Pub. No.: WO91/14864
    PCT Pub. Date: Oct. 3, 1991

[30] Foreign Application Priority Data
Mar. 17, 1990 [DE] Fed. Rep. of Germany ....... 4008675

[51] Int. Cl.⁵ ............ F16K 31/06; F02M 51/06; B23K 26/00
[52] U.S. Cl. .............. 251/129.21; 251/368; 29/890.124; 29/890.129; 228/263.15; 239/585.1
[58] Field of Search .......... 251/129.21, 368; 239/585; 228/208, 263.15; 29/890.124, 890.129

[56] References Cited
U.S. PATENT DOCUMENTS
2,759,249  8/1956  Eberle ............ 228/263.15 X
4,946,132  8/1990  Reiter ............. 251/129.21

Primary Examiner—Arnold Rosenthal
Attorney, Agent, or Firm—Edwin E. Greigg; Ronald E. Greigg

[57] ABSTRACT

In electromagnetically actuatable valves having a core, surrounded by a magnet coil, and an armature that acts upon a valve closing body by means of a connecting tube, the connection between the connecting tube and the hard valve closing body is embodied by first providing the metallically harder closing body with a first spot weld, and after that this first spot weld is welded to the metallically softer connecting tube by means of a second spot weld, until the at least partly encompassing weld seam is formed between the valve closing body and the connecting tube, the weld seam assuring a safe and reliable connection. This embodiment of the valve is particularly well suited for injection valves of fuel injection systems.

16 Claims, 2 Drawing Sheets

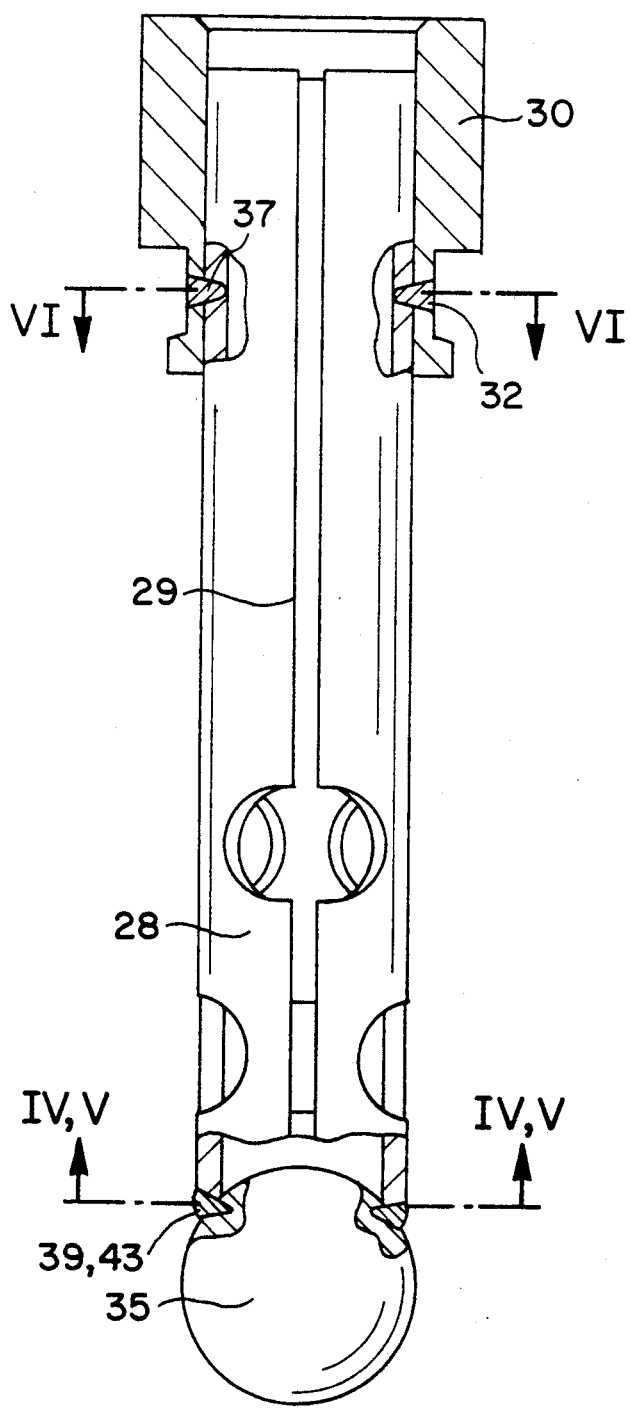
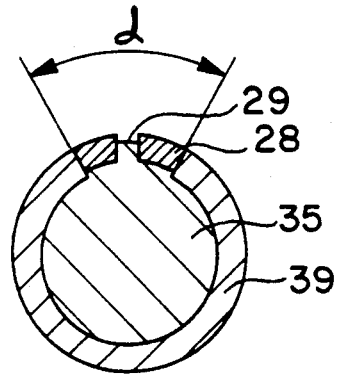
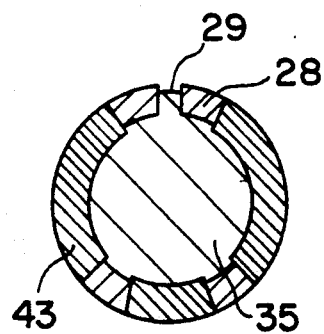
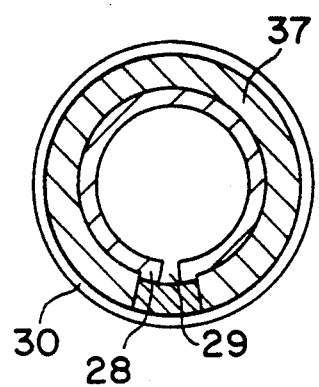

ELECTROMAGNETICALLY ACTUATABLE VALVE

BACKGROUND OF THE INVENTION

The invention is based on an electromagnetically actuatable valve as defined hereinafter In German Patent Application P 38 25 135.3 U.S. Pat. No. 4,944,486, an electromagnetically actuatable valve has already been proposed in which the metal valve closing body is joined to the metal connecting tube by soldering or welding. Since the valve closing body has high metal hardness, problems arise in joining the valve closing body and connecting tube to one another in a safe, reliable and strain-free manner.

ADVANTAGES OF THE INVENTION

The valve according to the invention has the advantage over the prior art that a safe, reliable and strain-free connection of the metallically soft connecting tube with the valve closing body, which by comparison is of metallically harder material, is attainable in a simple manner. If a crack occurs during the relatively fast setting of the first spot weld embodied on the valve closing body, then the crack is filled with the second spot weld, which is embodied between the first spot weld and the connecting tube, thereby assuring great strength of the connection.

Advantageous further features of and improvements to the valve disclosed in the main claim are possible with the provisions recited herein.

A continuous encompassing weld seam between the connecting tube and the valve closing body has the advantage of a particularly strong, reliable connection of the connecting tube and valve closing body.

If the connecting tube has a longitudinal slit that cuts open the connecting tube longitudinally, then it is especially advantageous if the weld seam is interrupted in the region of the longitudinal slit; otherwise there is the danger that during welding, weld splashes and weld beads will be created in the interior of the connecting tube, which can become detached during the operation of the injection valve. The processing time is reduced as well.

It is also advantageous if the welding between the connecting tube and the valve closing body is embodied of at least two separate, interrupted weld seams. As a result, during welding, there is less introduction of heat into the valve closing body and hence less distortion of the valve closing body caused by the introduction of heat, thus assuring the tightness between the valve closing body and a valve seat cooperating with the valve closing body, because of greater equality of congruence.

If the connecting tube is cut open longitudinally by a longitudinal slit, then in the case of welding joining the armature to the connecting tube it is advantageous if the weld seam is interrupted at least in the region of the longitudinal slit. With this weld as well, it cannot otherwise be precluded that splashes and weld beads that can become detached during injection valve operation will be created in the interior of the connecting tube during welding.

It is especially advantageous if the welding is embodied by means of a laser, so as to keep the flow of heat into the parts to be welded together as low as possible and thus to limit the distortion caused by the effective temperature as much as possible, as well as to assure an exact, safe and reliable weld.

DRAWING

Exemplary embodiments of the invention are shown in simplified form in the drawing and described in further detail in the ensuing description.

FIG. 2 shows a valve needle comprising an armature, connecting tube and valve closing body;

FIG. 4 shows a first exemplary embodiment of a weld seam course, in a section taken along the line IV—IV of FIG. 2;

FIG. 5 shows a second exemplary embodiment of a weld seam course in a section taken along the line V—V of FIG. 2; and FIG. 6 is a section taken along the line VI—VI of FIG. 2.

DESCRIPTION OF THE EXEMPLARY EMBODIMENTS

Figure 1:
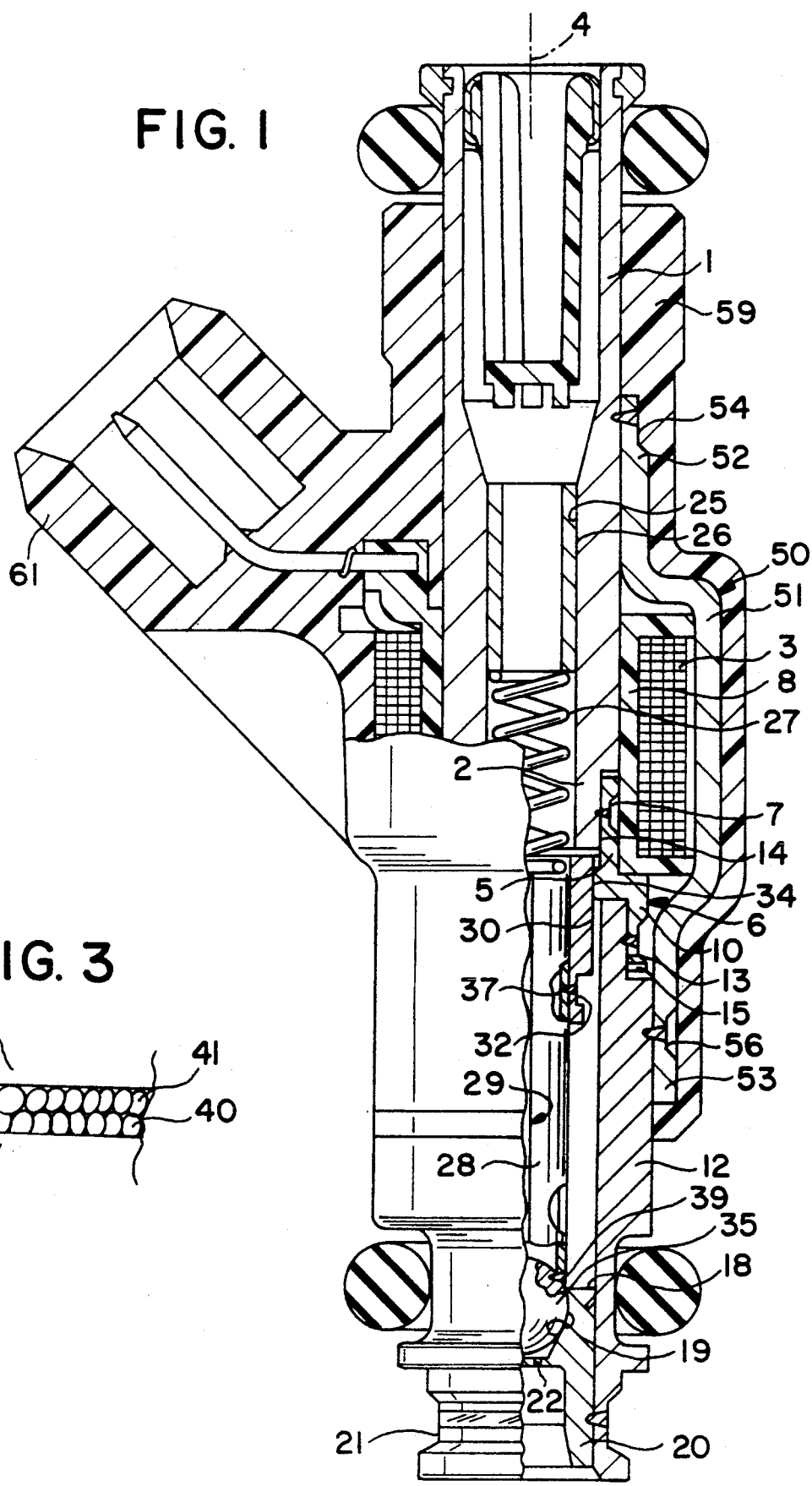
FIG. 1 shows an exemplary embodiment of a valve embodied according to the invention.

The electromagnetically actuatable valve shown by way of example in FIG. 1 in the form of an injection valve for fuel injection systems in internal combustion engines has a core 1, surrounded by a magnet coil 3 and embodied in tubular fashion, through which core the delivery of fuel takes place. Adjoining a lower end 2 of the core on which the magnet coil 3 is disposed with its coil core 8, a first connecting portion 5 of a tubular, metallic intermediate part 6 encompasses encompassing the core end 2 and is joined tightly to the core 1, concentrically with a longitudinal valve axis 4, by means of one weld seam, for example, that extends in a cross-sectional reduction formed at the circumference of the first connecting portion 5. A second connection portion 10 of the intermediate part 6, having a larger diameter than the first connecting portion 5, circumferentially engages a tubular, metal connecting part 12 and is joined to it by means of a weld made in a cross-sectional reduction 13 embodied on the downstream end of the second connecting portion 10. In order that the external dimensions of the injection valve can be small, the first connecting portion 5 circumferentially engages a retaining shoulder 14 of the core end 2, which has a smaller outside diameter than the core 1, and the second connecting portion 10 circumferentially engages a retaining shoulder 15 of the connecting part 12 that likewise has a smaller outside diameter than in the adjoining region.

A valve seat body 20 having a fixed valve seat 19 is welded, in a retaining bore 18, to the end of the connecting part 12 remote from the core 1; the weld extends in a cross-sectional reduction 21 of the connecting part 12. The disposition in succession of the core 1, intermediate part 6, connecting part 12 and valve seat body 20 thus forms a tight, rigid metal unit. At least one injection port 22 is embodied downstream of the valve seat 19 in the valve seat body 20.

A displacement sleeve 26, press-fitted into a flow bore 25 of the core 1, serves to adjust the initial spring tension of a restoring spring 27 resting on the displacement sleeve 26; this spring is supported by its downstream end on a metal connecting tube 28 that for instance has a longitudinal slit 29.

An armature 30 is joined by welding to the end of the connecting tube 28 toward the restoring spring 27, and a weld extends in the cross-sectional reduction 32, embodied remote from the core end 2, of this armature. The tubular intermediate part 6, with a guide collar 34, simultaneously acts as a guide for the armature 30. On the other end of the connecting tube 28, the tube is joined by welding to a valve closing body 35 that cooperates with the valve seat 19 and for instance is embodied as a ball made of a surface-hardened steel.

FIG. 2 shows a valve needle, comprising the armature 30, connecting tube 28 and valve closing body 35, on a greatly enlarged scale. The weld between the armature 30 and the connecting tube 28 is embodied by way of example, as shown in FIG. 6 as a section taken along the line VI—VI of FIG. 2, as an encompassing weld seam 37, which is interrupted only in the region of the longitudinal slit 29 of the connecting tube 28. Thus along with great strength and reliability of the weld, it is assured that no weld splashes and weld beads that can become detached during injection valve operation will get into the interior of the connecting tube 28 during welding.

Figure 3:
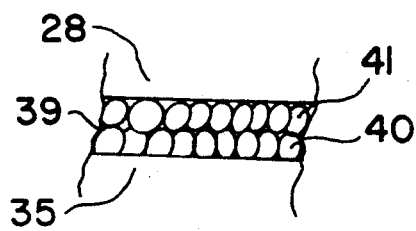
FIG. 3 shows a weld seam according to the invention.

FIG. 3 shows a weld seam 39 according to the invention, between the connecting tube 28, which for instance is made of V2A steel, and the valve closing body 35, which is of a metallically harder material by comparison. In alternation, first the metallically harder valve closing body 35 is provided with a first spot weld 40, and after that this first spot weld 40 is welded to the metallically softer connecting tube 28 by means of a second spot weld 41, until the at least partly encompassing weld seam 39 is formed between the valve closing body 35 and the connecting tube 28.

As a result, cracks occurring in the relatively fast setting of the first spot weld embodied on the valve closing body are filled by the second spot weld embodied between the first spot weld and the connecting tube, assuring a very strong connection.

As FIG. 4 shows, which is a section taken along the line IV—IV of FIG. 2, the weld seam 39 in the first exemplary embodiment is interrupted in the region of the longitudinal slit 29 of the connecting tube 28, because otherwise there is the danger that during welding, weld splashes and weld beads that can detach during operation of the injection valve will be created in the interior of the connecting tube or will get into the tube interior. The weld seam 39 is interrupted in the region shown by way of example and described by the angle α. The angle α is between 25° and 45°, for example.

In a second exemplary embodiment, as shown in FIG. 5 in the form of a section taken along the line V—V of FIG. 2, a weld seam 43 joining the valve closing body 35 to the connecting tube 28 is interrupted not only in the region of the longitudinal slit 29 of the connecting tube 28 but also in two other regions, so that the weld seam 43 is embodied in three parts. As a result, during welding, the introduction of heat into the valve closing body 35 and thus the distortion of the valve closing body 35 caused by the introduction of heat are reduced, and the tightness between the valve closing body 35 and the valve seat 19 is thus assured.

However, in the case of a connecting tube not having any longitudinal slit, it is also possible for the weld seam to be embodied encompassingly, in order to create a particularly strong, reliable connection that is simple to produce.

The magnet coil 3 is surrounded completely in the axial direction and at least partly in the circumferential direction by at least one conduction element 50, embodied as a hoop in the exemplary embodiment and serving as a ferromagnetic element. The conduction element 50 is adapted by its region 51 to the contour of the magnet coil 3; an upper end portion 52 extending radially inward partly encompasses the core 1, and a lower end portion 53 partly encompasses the connecting part 12. The upper end portion 52, by its end remote from the valve closing body 35, is joined to the core 1, for instance by means of a weld embodied in a simple cross-sectional reduction 54 of the upper end portion 52. By its lower end portion 53, the conduction element 50 is joined to the connecting part 12, for instance by welding, in a cross-sectional reduction 56 of the lower end portion 53.

In the exemplary embodiments of the invention the welds are embodied by means of a laser, in order to keep the flow of heat into the parts to be welded together as low as possible and to attain an exact, safe and reliable weld. If the flow of heat into the parts is overly high, the danger exists that they may become distorted under the influence of temperature, so that reliable valve function is no longer assured.

At least part of the core 1 and the magnet coil 3 are encompassed over their entire axial length by a plastic sheath 59, which also encompasses at least the intermediate part 6 and part of the connecting part 12. An electrical connection plug 61, by way of which the electrical connection of the magnet coil 3 and thus its excitation is effected, is formed onto the plastic sheath 59.

The welding according to the invention of the metallically soft connecting tube 28 and the valve closing body 35 which is by comparison of metallically harder material forms a safe and reliable connection between the connection tube 28 and the valve closing body 35, without the first spot weld 40 or the second spot weld 41 having cracks. In order to reduce the flow of heat into the valve closing body 35 during welding and/or, in the case of the connecting tube 28 having the longitudinal slit 29, to prevent the creation of weld splashes and weld beads in the interior of the tube, the weld seam 39 is embodied in interrupted fashion.

The foregoing relates to a preferred exemplary embodiment of the invention, it being understood that other variants and embodiments thereof are possible within the spirit and scope of the invention, the latter being defined by the appended claims.

We claim:

1. An electromagnetically actuatable valve, in particular an injection valve for fuel injection systems of internal combustion engines, having a core surrounded by a magnet coil, a metal valve closing body (35), an armature oriented toward the core and joined to a metal connecting tube (28), said metal connecting tube on a lower end remote from the armature is joined to said metal valve closing body by an at least partially encompassing first weld seam (39), the metal connecting tube being made of a metallically soft material and the valve closing body (35) being made by comparison of a metallically harder material, and the first weld seam (39) between the connecting tube (28) and the valve closing body (35) is effected by first and second spot welds (40, 41), such that in alternation said first spot weld (40) is applied along said harder metallic valve closing body (35) juxtaposed said lower end of said metal connecting tube (28), after which said second spot weld seam (41) is applied to said softer metallic connecting tube (28) adjoining said first spot weld, until said first and second spot welds form the at least partially encompassing first weld seam (39).

2. A valve as defined by claim 1, in that the first weld seam (39) between the connecting tube (28) and the valve closing body (35) is embodied as an encompassing weld seam.

3. A valve as defined by claim 1, in which said connecting tube has a longitudinal slit (29) dividing the connecting tube longitudinally, and the weld seam (39) is interrupted in the region of the longitudinal slit (29).

4. A valve as defined by claim 1, in that the first weld seam (39) between the connecting tube (28) and the valve closing body (35) is embodied as at least two individual, interrupted weld seams.

5. A valve as defined by claim 3, having a second weld seam (37) joining the armature (30) to an upper end of the connecting tube (28), in that the second weld seam (37) is interrupted at least in the region of the longitudinal slit (29).

6. A valve as defined by claim 1, in that the first and second spot welds are embodied by means of a laser.

7. A valve as defined by claim 2, in that the first and second welds are embodied by means of a laser.

8. A valve as defined by claim 3, in that the first and second welds are embodied by means of a laser.

9. A valve as defined by claim 4, in that the first and second welds are embodied by means of a laser.

10. A valve as defined by claim 5, in that the first and second spot welds are embodied by means of a laser.

11. An electromagnetically actuatable valve as set forth in claim 1 in which said armature has a reduced lower end portion that encompasses an upper end portion of said metal connecting tube (28) with a weld seam (37) at least partially surrounding said reduced lower end of said armature that joins said lower end of said armature to said upper end of said metal connecting tube (28).

12. An electromagnetically actuatable valve as set forth in claim 11 in which said metal connecting tube (28) has a smaller diameter than said valve closing body (35) and said lower end of said metal connecting tube is joined to said valve closing body by said first weld seam along a circle in a plane perpendicular to an axis of said metal connecting tube.

13. A method of securing a bottom end of a metal connecting tube (28) made of a metallically soft material to a valve closing body (35) made by comparison of a metallically harder material which comprises positioning said metal connecting tube onto said valve closing body, applying a first spot weld (40) to said valve closing body juxtaposed said bottom end of said metal connecting tube, subsequently applying a second spot weld (41) to said first spot weld (40) and to said bottom end of said metal connecting tube thereby forming a combined first weld seam (39) formed by said first and second spot welds.

14. A method as set forth in claim 11 in which an upper end of said metal connecting tube is secured to an armature of an electromagnetically actuatable valve which comprises positioning said armature and said upper end of said metal connecting tube together, applying a second weld seam to said upper end of said metal connecting tube and said armature thereby securing said armature to said upper end of said metal connecting tube.

15. A method as set forth in claim 13 wherein said first and second spot welds are formed by a laser.

16. A method as set forth in claim 14 wherein said first and second spot welds are formed by a laser.

* * * * *